Feb. 27, 1940.   W. H. ELLIS   2,191,524
DIPPER FOR ICE CREAM OR OTHER USAGE
Filed Feb. 17, 1939

Inventor
Walter Harvey Ellis

Patented Feb. 27, 1940

2,191,524

UNITED STATES PATENT OFFICE 2,191,524

DIPPER FOR ICE CREAM OR OTHER USAGE

Walter Harvey Ellis, Detroit, Mich.

Application February 17, 1939, Serial No. 256,968

7 Claims. (Cl. 107—48)

This invention relates, in general, to dippers for ice cream or other matter to be proportioned, and, in particular, to the incorporation within the shell of the dipper of a flexible lining or diaphragm which is capable of being deformed, partially displaced, or actuated by fluid pressure applied between the diaphragm and the shell of the dipper in such a way as to cause displacement of the diaphragm, thereby counteracting or relieving the natural forces such as vacuum, friction, etc., exerted on the ice cream or other substance with which the dipper may be filled, and thus allowing it to be ejected or to drop freely out of the dipper.

Another object is to eliminate external, mechanical activating appliances such as levers, gears, springs, scrapers, etc., which might form receptacles for accumulation of grease, cream and other putrescent substances, and yet provide an instrument for serving ice cream or other substances in which the operating mechanism is absolutely sealed from contact with the food being served and is as a result susceptible to complete sanitation.

A further object is to supplant the wear of moving mechanical parts by substituting a pneumatic or hydraulic method of operation.

Another object of the present invention is to provide a new and improved proportioning device, such as an ice cream dipper, in which the ejection therefrom of the substance proportioned thereby is more easily and readily accomplished than heretofore, and in which the surface actually contacting the substance being quantitatively proportioned presents little or no difficulty in the cleaning thereof or in the maintenance of a clean condition.

Another object herein is to provide a new and improved proportioning device which employs fluid pressure in the ejection of the proportioned substance and wherein manipulation is simplified and efficiency in operation maximized.

Still another object is to improve a device of the character described so as to obviate the objections existing in or prevailing with presently known devices of a similar nature.

Other objects and advantages of the invention will become readily apparent from a reference to the following specification taken in conjunction with the accompanying sheet of drawings in which.

Figure 1:
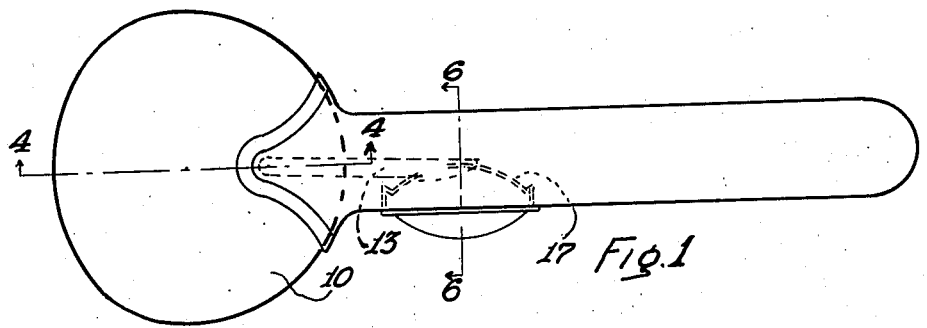
Figure 1 is a top plan view of the device.
Figure 2:
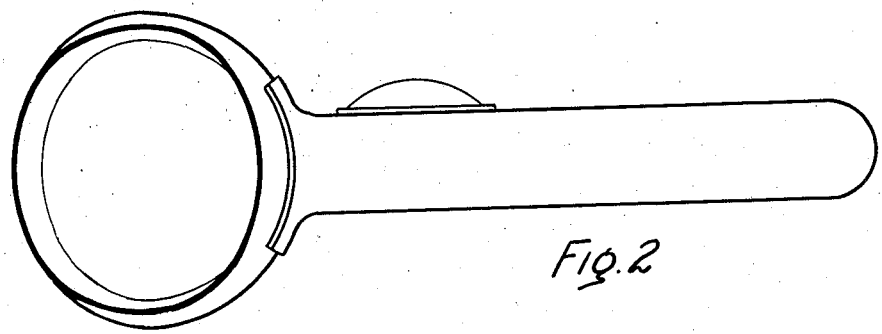
Fig. 2 is a bottom plan view.
Figure 3:
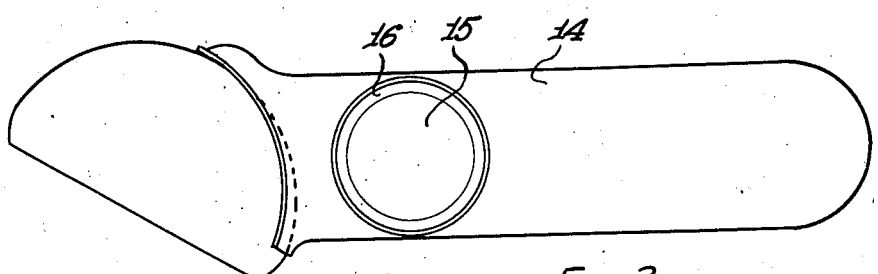
Fig. 3 is a side elevation.

The device in the figures comprises a proportioning member or dipper shell 10, an annular cutter or vulcanizing ring 11, a flexible rubber diaphragm 12, an air tube 13, a handle 14, an ejector bulb 15, an ejector bulb ring 16, an ejector bulb socket 17, and an orifice 18. The ring 11 is employed for interconnecting the shell 10 and diaphragm 12, the tube 13 is employed for communicating the region intermediate said shell and said diaphragm with a source of pressure, and the bulb 15, secured to the handle 14 by means of the ring 16 and reenforced by the socket 17, is employed as the agency by which said pressure may be received and transmitted through the orifice 18 into said tube. As will be noted by a comparison between Figs. 4 and 5, the diaphragm 12 is free of the shell 10 except at the jointure therebetween caused by the ring 11.

The outer lower edge of the diaphragm 12 is held firmly in place by being vulcanized to the contact surface of the vulcanizing cutter or ring 11 which in turn is hermetically sealed to the inner lower edge of the shell 10 by soldering, sweating or other methods. The tube 13 is sealed at one end into an aperture at the top of the shell 10 and at the other end it is sealed, soldered, welded or brazed to an aperture in the ejector bulb socket 17 so that it forms a pressure passage for air or other fluid from the ejector bulb socket to the inside of the dipper shell.

It will be noted that the proportioning member or shell 10 is rigid and bowl-shaped and that the normal shape of the flexible diaphragm 12 is such that the latter fits into the former so as to seat itself thereagainst. It will also be noted that the annular cutter or vulcanizing ring is also rigid and provides the actual cutting element for the proportioning process, this cutter being arranged between the peripheral portions of said member and said diaphragm and having the inner of its two convergent, cutting edge-forming surfaces providing an unbroken continuation of the smooth inner surface of said diaphragm. This eliminates any inner joint between the cutter and the diaphragm or any other space in which portions of the proportioned substance may become lodged and cause a lack of sanitation thereat or a difficulty in cleaning or proper removal thereof. It also permits an ejection of a more perfectly shaped proportioned body and facilitates such ejection. It further eliminates any cause for distress in the rubberized diaphragm at the area of otherwise greatest weakness, namely, at its peripheral annulus.

Figure 4:
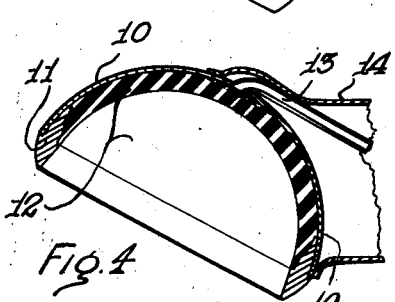
Fig. 4 is a section taken along the lines 4—4 in Fig. 1.
Figure 5:
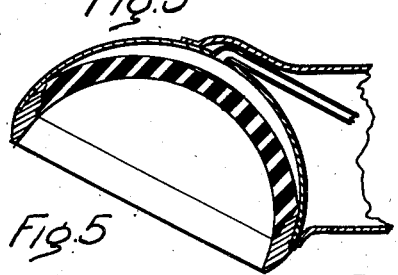
Fig. 5 is a view similar to Fig. 4 but showing the diaphragm in the position assumed thereby during use of the device.
Figure 6:
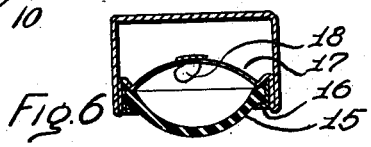
Fig. 6 is a section taken along the lines 6—6 in Fig. 1.

Figure 6, a cross section of the dipper handle, shows a section of the ejector bulb 15 which is vulcanized to the ejector bulb ring 16 which is pressed and sealed into the neck of the ejector bulb socket 17, 18 being the orifice, in the bottom of the socket, to which is sealed the handle of the tube 13 leading to the dipper shell 10 of Figure 4.

It will be noted that the shell 10 and the handle 14 are made integral with each other so that the device is easily manipulated and can withstand a heavy pressure at the handle when the body of the substance which includes the portion to be quantitatively determined by the dipper end is hard. It will also be noted that the handle itself is hollow and carries the communicating tube 13, the opening into the shell 10 being within said handle, so that the working parts of the the device are concealed and protected from dirt or the collection thereof and from accidental breakage or damage thereto. It will be further noted that the collapsible chamber which is defined by the rigid wall 17 and the flexible wall 15 is in the handle 14 at a position easily available to the thumb of the operator, so that the operator can easily perform with one hand the two steps of proportioning the substance and ejecting it from the device, the wall 15 being accessible from without the handle 14, and the hermetically sealed handle chamber being in exclusive communication with the hermetically sealed dipper-end chamber through the agency of the concealed tube 13.

The operation of the mechanism is as follows: Upon the pressure of the operator's thumb on the ejector bulb 15 the fluid or air contained within the bulb is compressed and forced to flow through tube 13 to the space between the inside of the dipper shell 10 and the periphery of the dipper shell diaphragm 12 thereby causing the diaphragm to deform, and change the original radius of its inner surface so that the contained ice cream or other substance is loosened and displaced or ejected.

Although the invention has been described with some detail it is not intended that such detailed description is to be definitive of the limits of the inventive idea. The right is reserved to make such changes in the details of construction and arrangement of parts as will come within the purview of the attached claims.

I claim:

1. In a device of the character described having a rigid, bowl-shaped proportioning member, a flexible diaphragm normally seated against the surface of one side of the member, an annular cutter arranged between and sealed to the marginal portions of the member and said diaphragm, means for establishing a pressure between the member and said diaphragm for separating from the member substantially that portion of said diaphragm disposed within said cutter.

2. In a device of the character described having a rigid, bowl-shaped proportioning member and a manipulating handle therefor, a flexible diaphragm normally seated against the surface of one side of the member, an annular cutter arranged between and sealed to the marginal portions of the member and said diaphragm, and means carried by and actuated at the handle for establishing a pressure between the member and said diaphragm for separating from the member substantially that portion of said diaphragm disposed within said cutter.

3. In a device of the character described having a rigid, bowl-shaped proportioning member, a flexible diaphragm normally seated against the surface of one side of the member, an annular cutter sealed to the marginal portion of the member internally thereof and to the marginal portion of said diaphragm externally thereof, and means for establishing a pressure between the member and said diaphragm for separating from the member substantially that portion of said diaphragm disposed within said cutter.

4. In a device of the character described having a rigid, bowl-shaped proportioning member and a manipulating handle therefor, a flexible diaphragm normally seated against the surface of one side of the member, an annular cutter sealed to the marginal portion of the member internally thereof and to the marginal portion of said diaphragm externally thereof, and means carried by and actuated at the handle for establishing a pressure between the member and said diaphragm for separating from the member substantially that portion of said diaphragm disposed within said cutter.

5. In a device of the character described having a rigid, bowl-shaped proportioning member, a flexible diaphragm normally seated against the surface of one side of the member, an annular cutter arranged between and in sealing engagement with the peripheral portions of the member and said diaphragm and having inner and outer converging surfaces forming an annular cutting edge in spaced relation to the edges of the member and said diaphragm, said inner surface of said cutter providing an unbroken continuation of the inner surface of said diaphragm, and means for establishing a pressure between the member and said diaphragm for separating from the member substantially that portion of said diaphragm disposed within said cutter.

6. In a device of the character described having a rigid, bowl-shaped proportioning member and a manipulating handle therefor, a flexible diaphragm normally seated against the surface of one side of the member, an annular cutter arranged between and in sealing engagement with the peripheral portions of the member and said diaphragm and having inner and outer converging surfaces forming an annular cutting edge in spaced relation to the edges of the member and said diaphragm, said inner surface of said cutter providing an unbroken continuation of the inner surface of said diaphragm, and means carried by and actuated at the handle for establishing a pressure between the member and said diaphragm for separating from the member substantially that portion of said diaphragm disposed within said cutter.

7. In a device of the character described having a rigid, bowl-shaped proportioning member, a manipulating handle therefor and rigidly secured thereto, and a flexible diaphragm normally seated against one side of the proportioning member and marginally sealed thereto at its periphery to provide an hermetically sealed, expansible chamber therebetween, an opening formed in the proportioning member within the handle and in communication with the expansible chamber, a pair of walls carried by the handle and cooperable to form therewithin an hermetically sealed, collapsible chamber, one of said walls being flexible and accessible from without the handle to be moved relatively to the other of said walls, and means carried within the handle for communicating said collapsible chamber exclusively with said opening for conveying fluid from one chamber to the other during the movement of said flexible wall with respect to said other wall.

WALTER HARVEY ELLIS.